May 31, 1960 J. H. DENNIS 2,939,081
INFORMATION STORAGE SYSTEM
Filed Nov. 19, 1956 3 Sheets-Sheet 1
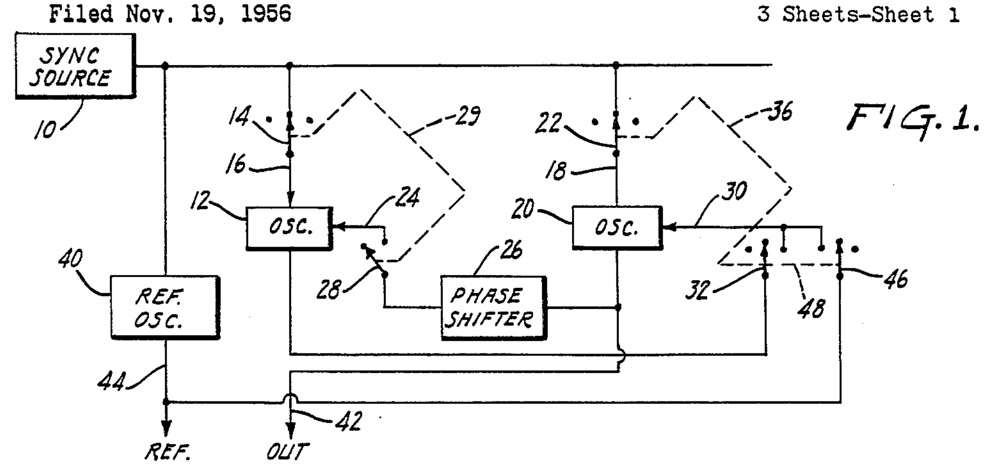
FIG. 1.
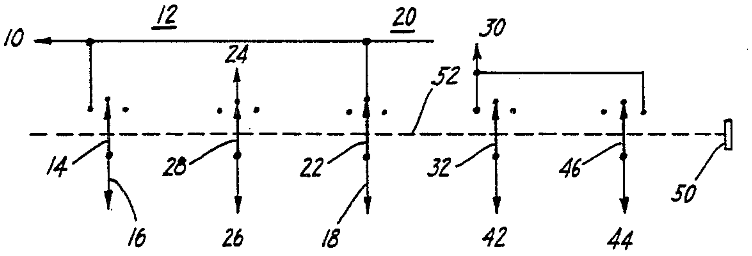
FIG. 1A.
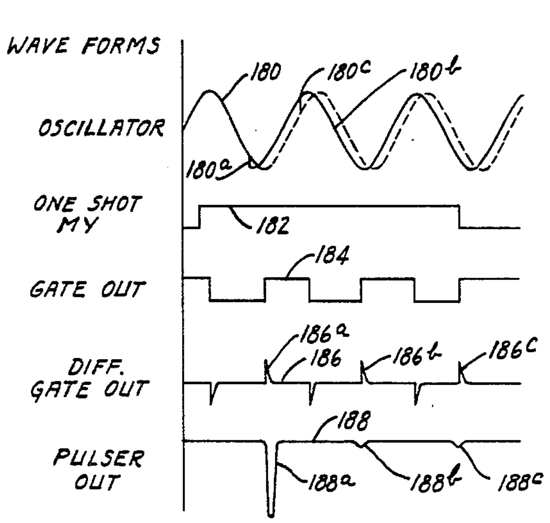
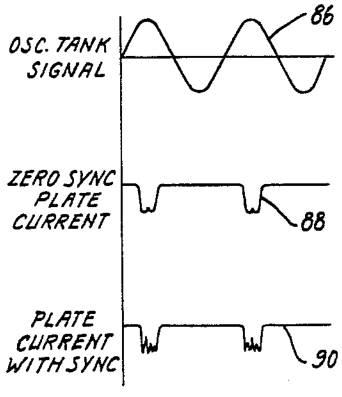
FIG. 4.
FIG. 5.
INVENTOR.
JANE H. DENNIS
BY
[signature]
ATTORNEY

INFORMATION STORAGE SYSTEM

Filed Nov. 19, 1956

INVENTOR.
JANE H. DENNIS
BY
[signature]
ATTORNEY

ARRANGEMENT OF GEARS AS DECIMAL COUNTER INCLUDING READOUT

INVENTOR.
JANE H. DENNIS
BY
Glenn V. Haystine
ATTORNEY

United States Patent Office 2,939,081

Patented May 31, 1960

2,939,081

INFORMATION STORAGE SYSTEM

Jane H. Dennis, Cambridge, Mass., assignor to Philco Corporation, Philadelphia, Pa., a corporation of Pennsylvania Filed Nov. 19, 1956, Ser. No. 623,170

12 Claims. (Cl. 328—122)

The present invention relates to information storage systems and more particularly to systems in which stored information is represented by an electrical signal.

The need for a relatively simple storage circuit having a large number of reliable stable states is well known to workers in the computer art. Most memory circuits now in current use have only two usable stable states. For example, magnetic core memory circuits depend on flux in one direction through a core to represent one value and flux in the opposite direction through the core to represent another value. Bistable circuits employing vacuum tubes and transistors also have only two stable states. The fact that all simple practical storage elements known to date have only two reliable stable states has restricted computer design to the binary system of representing numbers within the computer. The use of the binary system in computers has several disadvantages. In many instances input and output data is required to be in the decimal system of notation. Therefore binary to decimal converters are required. An additional disadvantage is that more digits are required to represent a quantity in the binary system than are required to represent the same quantity in the decimal system. Also, it is difficult to read without error binary numbers which are composed of only zeroes and ones.

A computer operating with the radix ten has the advantage that it may receive decimal numbers directly. However, the storage circuit for each digit must have ten stable states corresponding to the ten digit symbols employed in the decimal system.

A radix greater than ten may be useful in computers designed for the purpose of making translations from one language to another. Preferably the radix used should be at least as large as the number of characters in the longest alphabet. Again, for efficient information storage, the individual storage elements should have at least as many reliable stable states as there are digit symbols in the number system being employed. Mechanical storage systems which may have many stable states are far too slow in their operation for the present day high speed electronic computers. Electrical systems can provide the required speed but experience has shown that it is impractical to represent more than two or three symbols by different amplitude levels of an electrical signal.

Therefore it is an object of the invention to provide a simple electrical information storage system having a large number of stable states.

It is a further object of the present invention to provide a circuit for storing information as the phase of an electrical signal.

Still another object of the present invention is to provide a novel impulse or signal counter circuit employing phase quantized data to represent stored information.

A further object of the present invention is to provide means for changing the phase of an electrical signal by preselected steps.

These and other objects of the invention are accomplished by providing a timing oscillator operating at a preselected frequency and a storage oscillator operating at a submultiple of the frequency of the timing oscillator. The ratio of the frequencies of the two oscillators is made equal to or greater than the radix to be employed. The signal from the timing oscillator is supplied to the storage oscillator to maintain the signal generated by the storage oscillator at a fixed phase with respect to the signal supplied by the timing oscillator. Information is stored in the circuit by changing the phase of the storage oscillator by a preselected number of integral cycles of the signal supplied by the timing oscillator. Information is read from the circuit by comparing the phase of the signal generated by the storage oscillator with the phase of a signal generated by a reference oscillator operating at the same frequency as the storage oscillator and always maintaining a fixed phase with respect to the signal from the timing oscillator. Higher powers of the radix are handled by cascading two or more storage oscillator circuits.

For a better understanding of the invention together with other and further objects thereof reference should now be made to the following detailed description which is to be read in conjunction with the accompanying drawings in which:

Fig. 1 is a block diagram of a system which illustrates the principle of information storage in terms of the phase of an oscillatory signal;

Fig. 1A is a schematic drawing of a modified arrangement of switches which may be employed in the system of Fig. 1;

Fig. 4 is a series of waveforms which explain the operation of the oscillator portions of the system of Fig. 3;

Fig. 5 is a series of waveforms illustrating the operation of the entire system of Fig. 3.

In Fig. 1, block 10 represents a source of timing signals. Source 10 may be a sinusoidal wave oscillator operating at some conveniently high frequency, for example one megacycle per second. Frequency stabilizing means may be employed in source 10 to maintain the frequency relatively constant. However, if a single timing oscillator is employed for an entire computer, this timing oscillator becomes the primary standard for the computer in which the storage system is incorporated as well as for the storage system itself so that the stability of the frequency of the timing oscillator with respect to some standard outside the computer is not important.

Figures 2, 3:
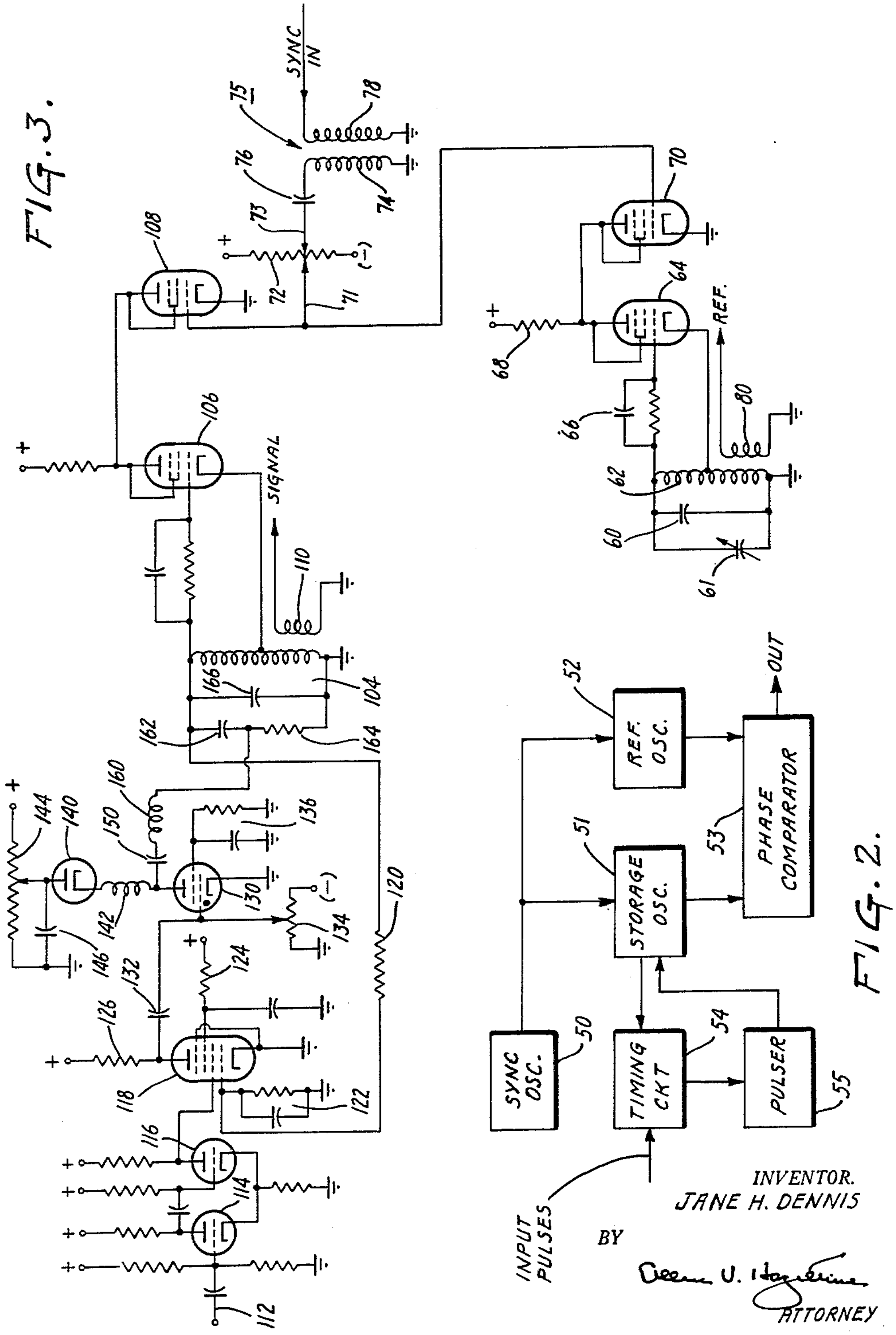
Fig. 2 is a block diagram of a preferred embodiment of the present invention.
Fig. 3 is a schematic diagram of the system of Fig. 2 which includes a phase quantized oscillator circuit in which the phase of the generated signal is changed by a preselected fraction of a cycle in response to an electrical input signal.

The signal from source 10 is supplied to the synchronizing signal input of an oscillator 12 through switch 14. Oscillator 12 may be a sinusoidal wave oscillator arranged to operate at a submultiple of the frequency of source 10, for example at a hundred kilocycles per second. Thus ten cycles will be supplied by source 10 to oscillator 12 for every cycle of the output signal of oscillator 12. Oscillator 12 may be a Hartley oscillator circuit with means for supplying a synchronizing signal to the anode circuit and a second means for supplying a synchronizing signal to the tank circuit. Fig. 2 includes an oscillator circuit with means for so injecting synchronizing signals. Other forms of circuits will occur to those skilled in the art. Switch 14 has two positions. In the position shown in Fig. 1 the output of source 10 is connected to the synchronizing input 16 of oscillator 12. In the second position of switch 14 the synchronizing input 16 of oscillator 12 is disconnected from the rest of the circuit.

The output of source 10 is also connected to a synchronizing input 18 of a second oscillator 20 through a second switch 22. Oscillator 20 has the same operating frequency as oscillator 12. Switch 22 is a three position switch. The position shown in Fig. 1 connects the source 10 to input 18. The second and third positions of switch 22 disconnect synchronizing signal input 18 from the rest of the circuit.

The output of oscillator 20 is connected to the second synchronizing input 24 of oscillator 12 through a phase shifter 26 and a two position switch 28. Preferably the ratio of the phase shift produced by phase shifter 26 at the frequency of operation of oscillators 12 and 20 to one cycle of the signal from oscillator 20 is the same as the ratio of the frequency of oscillator 20 to the frequency of source 10. However, this phase shift may have any value which corresponds to an integral number of cycles of the signal from source 10. Switches 14 and 28 are ganged as represented by the broken line 29 so that only one of the synchronizing inputs 16 and 24 is energized at a time. With switch 28 in the position shown in Fig. 1, phase shifter 26 is disconnected from input 24. When switch 14 is thrown to disconnect input 16 from source 10, switch 28 will be closed connecting phase shifter 26 to input 24. The output of oscillator 12 is connected to a second synchronizing input 30 of oscillator 20 through one position of a three position switch 32. Switches 32 and 22 are ganged as represented by the broken line 36 so that only one of inputs 18 and 30 is energized at a time.

Source 10 also supplies a synchronizing signal to a reference oscillator 40. Oscillator 40 has a frequency which is the same as the frequency of operation of oscillators 12 and 20 and is so arranged that it maintains a fixed phase with respect to the signal supplied by source 10. A switch 46 is also ganged to switch 32 as shown by the broken line 48. The arm of switch 46 is connected to the output 44 of reference oscillator 40. The extreme left hand contact of switch 46 is connected to synchronizing input 30 of oscillator 20. Oscillators 12 and 20 together form a storage oscillator circuit. The output connection of this circuit is represented by connection 42.

The circuit of Fig. 1 operates in the following manner. To set the storage oscillator circuit to zero switches 14 and 28 may remain in the position shown in Fig. 1. Switches 22, 32 and 46 are thrown to their extreme left positions which connects the output of reference oscillator 40 to the synchronizing input 30 of oscillator 20. Oscillator 20 will thereupon assume a phase identical to that of reference oscillator 40. It is assumed that the output circuit of oscillator 40 includes a suitable isolation stage such as a cathode follower so that there is no tendency for oscillator 40 to change to the phase of oscillator 20. Switches 22, 32 and 46 are then thrown to their center positions. Oscillator 20 is now in its zero or reference phase condition. It is held in this reference phase condition by the signal supplied by source 10 to synchronizing input 18. To indicate a count of one, switches 14 and 28 are thrown to their right-hand position. This disconnects synchronizing input 16 from the output of source 10 and connects synchronizing input 24 to the output of phase shifter 26. If the circuit of Fig. 1 is arranged to count from zero to nine using a radix of ten, source 10 preferably will have a frequency ten times that of oscillator 20 and phase shifter 26 preferably will have a phase shift of 36° or 1/10 of a cycle at the frequency of oscillator 20. Therefore oscillator 12 will assume a phase which is 36° behind that of oscillator 20.

Switches 14 and 28 may now be returned to their left-most position which will reconnect synhcronizing input 16 to the output of synchronizing source 10. Since oscillator 12 and oscillator 20 are now both connected to the output of synchronizing source 10, the 36° phase difference between the outputs of these two oscillators will be maintained. The count of one is completed by throwing switches 22 and 32 to their right-most position which connects the output of oscillator 12 to the synchronizing input 30 of oscillator 20. At the same time, synchronizing input 18 is disconnected from the output of source 10. Oscillator 20 will now assume the phase of oscillator 12, that is, it will drop back in phase by 36°. Switch 36 may now be returned to the position shown in Fig. 1 and oscillators 12 and 20 will maintain the new phase of oscillation. It should be noted that the phases of both oscillators 12 and 20 are 36° behind the zero or cleared phase position which is being maintained by reference oscillator 40. It will be remembered that oscillator 40 always registers the zero or cleared phase of oscillator 20 since it is always connected to the output of synchronizing source 10.

To register a second signal, switches 14 and 28 are again moved to their right-most position. This causes oscillator 12 to slip back another 36° for a total of 72° behind the zero phase of oscillator 20. Switches 14 and 28 are then returned to the position shown in Fig. 1 and switches 22 and 32 are again moved to their right-hand position. This causes oscillator 20 to assume the phase of oscillator 12, that is, it will slip back another 36° in phase for a total of 72° behind its zero or reference phase condition.

The number registered in the circuit of Fig. 1 can be determined by measuring in degrees the phase angle between the signal on lead 42 and the signal on lead 44 and dividing this phase angle by 36.

Fig. 1A shows a modified arrangement of switches 14, 22, 28, 32 and 46. In Fig. 1A all of the switches are ganged so that they may be operated by a single button 50. The mechanical connection between button 50 and the five switches is represented by the dashed line 52. The normal or rest position of button 50 is preferably the position shown in Fig. 1A. If button 50 is moved to the right as shown in Fig. 1, synchronizing input 30 of oscillator 20 is connected to the output 44 of the reference oscillator 40. Moving button 50 to the right might correspond to raising the button on the keyboard of a calculator. If button 50 is momentarily raised and then allowed to return to the rest position shown in Fig. 1A, oscillator 20 will be maintained in its cleared or zero phase by reason of the fact that synchronizing input 18 is connected to the output of synchronizing source 10. With the switches in the position shown in Fig. 1A, synchronizing input 24 of oscillator 12 is connected to the output of phase shifter 26. Thus oscillator 12 is locked in phase 36° behind oscillator 20. If button 50 is depressed, that is if it is moved to the left as shown in Fig. 1A, synchronizing input 18 of oscillator 20 is disconnected from synhcronizing source 10 and synhcronizing input 30 is connected to the output of oscillator 12. At the same time, synchronizing input 24 of oscillator 12 is disconnected from the output of phase shifter 26 and synchronizing input 16 is connected to synchronizing source 10. This maintains the phase of oscillator 12 36° behind the reference phase while oscillator 20 is brought into step with oscillator 12 by the synchronizing signal now supplied to input 30. A spring (not shown) may be provided for returning button 50 to its rest position.

The system of Fig. 1, modified to include the switching arrangement shown in Fig. 1A, will advance one count each time button 50 is depressed. The system illustrated in Fig. 1 will count only from zero to nine. A tenth input signal will return the storage oscillator circuit to its zero or reference phase.

The system shown in Fig. 1 and described above will store a single digit for any radix equal to or less than 10. If a higher radix is desired the ratio of the frequency of source 10 to the frequency of oscillators 12 and 20 should be increased and the phase shift of phase shifter 26 should be decreased accordingly. If a radix less than 10 is to be used, for example a radix of 5, the ratio of the frequency of source 10 to the frequency of oscillators 12 and 20 may be left at 10 and the phase shift introduced by phase shifter 26 may be increased to 72° so that the oscillators 12 and 20 step two cycles of the signal from source 10 on each complet cycle of operation of the switches. It should be remembered that phase shifter 26 must shift the phase of the signal from oscillator 20 by an amount equal to an integral number of cycles of source 10.

Fig. 2 is a block diagram of a preferred embodiment of the invention which operates on the phase quantized principle explained above. However, the system of Fig. 2 responds to an electrical input signal rather than a mechanical input signal. In Fig. 2 the synchronizing oscillator is represented by block 50, the storage oscillator by block 51 and the reference oscillator by block 52. A phase comparator circuit 53 is provided for comparing the phase of the signal supplied by the storage oscillator 51 with the phase of the signal supplied by reference oscillator 52. As noted above this phase is an indication of the information stored in the system of Fig. 2. Electrical impulses to be counted are supplied to one input of a timing circuit 54. Timing circuit 54 receives a second input signal from storage oscillator 51. For reasons which will be explained presently input signals to be counted should be supplied to storage oscillator 51 only at selected times in the cycle of the signal from storage oscillator 51. Therefore the function of timing circuit 54 is to convert the input pulses which may occur at random times to signals which occur at selected times in the cycle of the signal from storage oscillator 51. A circuit for performing this operation is shown in Fig. 3 which will be described presently. The output signal of timing circuit 54 is supplied to a pulser circuit 55. The function of pulser circuit 55 is to generate pulses of preselected amplitude and duration in response to the pulses received from timing circuit 54. The phase shift produced by electrical signal supplied to storage oscillator 51 is a function of the amplitude and time duration of the signals. Therefore, if constant increments of phase shift are required, signals of constant amplitude and time duration must be supplied. A preferred form of circuit for generating signals of constant amplitude and time duration is illustrated in Fig. 3.

Fig. 3 is a schematic drawing of a preferred embodiment of the invention corresponding to the block diagram shown in Fig. 2. The circuit of Fig. 3 makes use of the fact that an oscillator operating class C may be synchronized by a signal which is an integral multiple of its frequency of operation. Also in Fig. 3 the shift in phase of the storage oscillator is accomplished by pulsing the tank circuit of the oscillator in a manner which will be explained in more detail presently. Turning now to the circuit of Fig. 3, the tank circuit of the reference oscillator 52 comprises capacitors 60 and 61 and an inductor 62 connected in parallel. One end of the parallel combination is connected to ground. The other end is connected to the grid of an electron tube 64 through the resistor-capacitor biasing network 66. A tap on inductor 62 is connected to the cathode of electron tube 64. A resistor 68 connects the anode of tube 64 to a source of anode supply potential schematically represented by the plus sign (+). A second electron tube 70 has its anode connected to the anode of tube 64. The cathode of tube 70 is connected to ground. A control grid of tube 70 is connected to one movable tap 71 of a potentiometer 72. A second tap 73 on potentiometer 72 is connected to the secondary 74 of a transformer 75 through a D.C. blocking capacitor 76. The two ends of potentiometer 72 are connected to a source of positive supply potential and a source of negative supply potential represented schematically by the plus (+) and minus (−) signs in Fig. 3. A primary 78 of the transformer 75 is supplied with a signal from sync oscillator 50 which is shown in block form in Fig. 3. The signal supplied by sync oscillator 50 has a frequency which is an integer multiple of the frequency of operation of the oscillator including electron tube 64. A coil 80 coupled to inductor 62 provides means for deriving a reference signal from the oscillator circuit. This signal is supplied to phase comparator 53 of Fig. 2 which is not shown in Fig. 3.

Fig. 4 is a series of waveforms illustrating the operation of the reference oscillator portion of Fig. 3. An oscillator operating class C may be synchronized by a signal which is an integral multiple of its frequency of operation provided this synchronizing signal is interrupted at the frequency of operation of the oscillator to be synchronized. This interruption of the signal at the lower frequency is necessary in order to give the synchronizing signal a Fourier component at the frequency of the oscillator to be synchronized. It can be shown that if the frequency of this stabilizing oscillator is $n$ times the frequency of operation of the stabilized oscillator, there are $2n$ states of equilibrium for the oscillator circuit. Of these $2n$ states of equilibrium, $n$ are stable and $n$ are unstable. Which states are stable is dependent upon the fraction of a cycle in which anode current flows in the synchronized oscillator. A change in the fraction of the cycle in which anode current flows in the stabilized oscillator will cause a shift from stable to unstable equilibrium of the two groups of states. For example if the frequency of the synchronizing signal is ten times the frequency of the synchronized oscillator, increasing or decreasing by a fraction of a cycle the period during each cycle in which anode current flows in the synchronized oscillator can cause the synchronized oscilltor to shift in phase by $$\frac{360}{2n}$$

or 18° if $n=10$. One set of $n$ equilibrium conditions correspond to the $n$ positive peaks included in one cycle of the synchronized signal. The other group of $n$ equilibrium states corresponds to the $n$ negative peaks of the synchronizing signal within one cycle of the synchronized signal.

The synchronizing signal supplied by transformer 74 to the reference oscillator circuit will synchronize this circuit even though the tank circuit including capacitors 60 and 61 and inductor 62 are not tuned to an exact submultiple of the signal from synchronizing oscillator 50. The fact that the oscillator circuit is not operating at the frequency to which the tank circuit is tuned produces a tendency for the signal supplied by the oscillator to shift in phase with respect to the synchronizing signal. This tendency is overcome by the application of the synchronizing signal to the oscillator circuit. This tendency to shift in phase presents no difficulty in the reference oscillator circuit provided the detuning of the tank circuit is not so great that the oscillator will not respond to the synchronizing signal. However, it is a disadvantage in the storage oscillator circuit since it may affect the amount of phase shift introduced by a single input pulse. That is, it may cause the oscillator to shift by two increments of phase in response to a single signal or, if the tendency is to shift in phase in a direction opposite to the normal shift produced by the input signal, the oscillator may not shift in phase in response to an input signal.

Adjusting the taps 71 and 73 on potentiometer 72 adjusts both the D.C. bias on the control grid of tube 70 and the amplitude of the synchronizing signal supplied through the transformer. Waveform 86 in Fig. 4 represents the signal appearing across the tank circuit 60—62 of Fig. 2. Waveform 88 represents the voltage appearing across resistor 68 when tube 70 is biased so that no synchronizing signal is supplied to the circuit. Waveform 90 represents the plate current in tube 64 when the taps on potentiometer 72 have been adjusted to permit a synchronizing signal to be supplied by way of tube 70. Since electron tube 64 is operating class C, the plate current pulses in tube 64 can be considered as windows or gates through which the synchronizing signal is supplied to the tank circuit 60—62. This chopping action provides the necessary interruption of the synchronizing signal which is mentioned above. The adjustable capacitor 61 provides means for adjusting the frequency of the reference oscillator to the desired submultiple of the synchronizing signal supplied to the primary winding 78 of transformer 75.

Returning now to the description of the circuit of Fig. 3, the second oscillator, that is the storage oscillator 51 of Fig. 2, comprises tank circuit 104 and vacuum tubes 106 and 108. The synchronizing signal is supplied to the grid of tube 108 from the tap 71 on potentiometer 72. A coupling loop 110 associated with the tank circuit 104 provides means for deriving a signal from the oscillations present in tank circuit 104. This signal is supplied to the phase comparator 53 of Fig. 2.

Turning now to the means for changing the phase of the oscillations in tank circuit 104, terminal 112 provides a point to which pulses to be counted may be supplied. Terminal 112 is connected to the control grid of a vacuum tube 114. Tube 114 forms one-half of a unistable multivibrator. The other half of this multivibrator includes tube 116. It will be noted that this multivibrator is a conventional cathode coupled, unistable multivibrator. Circuits of this type are well known in the art and require no detailed description. The time constant of the coupling circuit of this unistable multivibrator is so selected that the quasi-stable state into which the multivibrator is keyed by a signal supplied to terminal 112 is made equal in duration to several cycles of the signal in tank circuit 104.

The anode of tube 116 is connected to the second grid of a vacuum tube 118. The first grid of tube 118 is supplied with a signal from tank circuit 104 by way of resistor 120. A self-biasing circuit 122 connects the control grid of tube 118 to ground. The suppressor grid of tube 118 is returned to cathode and the screen grid is returned to a point of fixed positive potential by the screen grid biasing network 124. The anode of tube 118 is connected to a source of anode supply potential through the load resistor 126.

The anode of tube 118 is connected to the control grid of a gas tetrode 130 through a capacitor 132. The D.C. bias for the control grid of gas tetrode 130 is provided by a potentiometer 134 which is connected between ground and a source of negative potential. The second grid of gas tetrode 130 is connected to ground through the parallel RC combination 136. The anode of gas tetrode 130 is connected to the cathode of a diode 140 by way of an inductor 142. The anode of diode 140 is connected to a tap on a potentiometer 144. Potentiometer 144 is connected between ground and a source of positive potential. A capacitor 146 is connected from ground to the tap on potentiometer 144. The time constant of the circuit between the tap on potentiometer 144 and ground is made equal to many cycles of the signal present in tank circuit 104.

The anode of gas tetrode 130 is connected to the tank circuit 104 by way of capacitor 150 and inductor 160. The connection to the tank circuit 104 is made by way of the series combination of capacitor 162 and resistor 164 which are connected in shunt with the main tuning capacitor 166 of tank circuit 104. Inductors 142 and 160, capacitors 150 and 162 and resistor 164 together comprise a critically damped pulse forming and shaping circuit.

The circuit of Fig. 3 operates in the following manner. The two oscillator circuits associated with tank circuits 104 and 60—62 respectively oscillate at a fixed frequency and phase under the control of the signal from transformer 75. An input signal to be registered is supplied to the input connection 112. The circuit of Fig. 3 responds only to positive pulse signals. If the signals to be registered are in some other form, means should be provided for converting these signals to positive pulses. The only required characteristic of the positive pulses is that they have sufficient amplitude to trigger the multivibrator to its quasi-stable state. The multivibrator is triggered to its quasi-stable state in the following manner. A positive pulse at terminal 112 initiates conduction through tube 114. Conduction through tube 114 causes the potential at the anode of this tube to drop. This drop in potential is communicated to the grid of tube 116 and cuts off this tube. Tube 116 will remain cut off for a time determined by the time constant of the resistor-capacitor circuit connected to its grid. This time is made equal to at least several cycles of the signal in tank circuit 104. The signal from tank circuit 104 is represented by the waveform 180 of Fig. 5. The signal from the multivibrator is represented by waveform 182.

As tube 116 is cut off, the anode potential rises, causing the second grid of tube 118 to rise to the point where conduction through tube 118 is possible. The signal appearing across tank circuit 104 is supplied to the control grid of tube 118. The time constant of the circuit including resistor 120 and biasing network 122 is such that the signal undergoes approximately ¼ cycle phase shift from tank circuit 104 to the control grid of tube 118. The amplitude of the signal supplied to the control grid of tube 118 is such that this tube is driven to saturation and to cut off on alternate half cycles of the signal. Therefore the output signal appearing at the anode of tube 118 will be the rectangular wave shown at 184 in Fig. 5. Capacitor 132 and resistor 134 form a differentiating circuit which converts the rectangular wave signal shown at 184 to the positive and negative pulses shown in waveform 186.

In the interval between pulses supplied to input terminal 112, the capacitor 146 will have charged to the potential of the tap on potentiometer 144. The first positive signal **186*a* following the step in waveform 182 will fire gas tetrode 130, thus allowing capacitor 146 to discharge through diode 140 and inductor 142. This results in the formation of the pulse 188*a* shown in waveform 188 of Fig. 5. This pulse will have an amplitude determined by the setting of the tap on potentiometer 144 and a duration depending upon the resonance and damping characteristics of the circuits associated with gas tetrode 130. The timing of pulse 188*a* is determined solely by the phase of the signal supplied to the control grid of tube 118. Therefore the amplitude, duration and timing of pulse 188*a* is independent of any characteristic of the signal supplied to input terminal 112. However, only one pulse is generated in the output of the gas tetrode 130 for each positive pulse supplied to input terminal 112**.

The pulse signal **188*a* appearing at the anode of gas tetrode 130 is introduced into the tank circuit 104 through the connection including capacitor 150, inductor 160, capacitor 162 and resistor 164. It will be seen that these four elements, together with the circuits associated with gas tetrode 130 and diode 140, comprise a critically-damped tuned-circuit pulser of a type which has frequently been employed in radar systems. All pulses produced by a circuit of this type will have the same energy content and hence will produce a known constant phase shift if applied at a fixed time in the cycle of the signal present in the tank circuit of an oscillator. The connection of capacitor 162 and resistor 164 across the tank circuit 104 causes the signal supplied by the pulser to produce the step 180*a* shown in waveform 180 of Fig. 4. Following step 180*a*, tank circuit 104** continues to oscillate at its natural frequency but at the phase shown at 180*b* rather than its original phase as represented by the dashed line 180*c*. The amplitude, duration and time of occurrence of pulse 188*a* is selected so that the phase of waveform 180 is shifted by one or more cycles of the synchronizing signal supplied from transformer 75. Therefore the tank circuit 104 will continue to oscillate with the phase 180*b* until such time as another signal is supplied to input terminal 112. The phase shift obtained depends on the part of the oscillator cycle in which it is pulsed. For instance, if the pulse occurs when the voltage across the capacitor is a minimum and the current in the inductor is a maximum, no phase shift will be obtained but there will be a momentary change in amplitude of the signal in the tank circuit. However, if the tank circuit is pulsed at the time that the voltage across the capacitor is a maximum, the phase of the oscillation in the tank circuit will be changed with no appreciable change in the amplitude of the oscillation. The phase shift produced will depend upon the area of the pulse in volt seconds, the natural frequency of the tank circuit and the amplitude of the oscillations in the tank circuit. If, in the absence of a synchronizing signal, the tank circuit is pulsed in such a way as to cause both an amplitude and a phase change, the amplitude change will disappear in time but the phase change will remain. If a synchronizing signal is present the phase of the oscillation will either be advanced one or more cycles of the synchronizing signal or, if the phase displacement is less than half a cycle of the synchronizing signal, the oscillation in the tank circuit will be forced to return to its original phase.

Returning now to the signal supplied to the grid of tube 130, the negative pulses in waveform 186 cannot fire gas tetrode 130. The positive pulses 186*b* and 186*c* will fire gas tetrode 130. However, the pulses 188*b* and 188*c* produced in response to pulses 186*b* and 186*c* will have a very low amplitude for the reason that capacitor 146 will not have had time to charge to any appreciable positive value in the intervals between pulses 186*a*, 186*b* and 186*c*. The shift in phase of the signal in the tank circuit caused by pulses 188*b* and 188*c* is not great enough to cause the signal in tank circuit 104 to lock on the next cycle of the signal supplied by transformer 75 so the tank circuit 104 will continue to oscillate with the phase shown at 180*b*.

At the end of the positive portion of waveform 182, tube 118 will again be cut off so that no further pulses are supplied to gas tetrode 130. Capacitor 146 will then recharge to the potential of the tap of potentiometer 144. This places the circuit in readiness for the reception of an additional pulse at input terminal 112. On the next pulse supplied to input 112 the same cycle will be repeated except that tank circuit 104 will be shifted from phase 180*b* to a new phase a fraction of a cycle behind phase 180*b*. The number of pulses which have been registered by the circuit can be determined by comparing the phase of the signal supplied by output 110 with the phase of the reference signal supplied by output 80.

The arrangement shown in Fig. 3 was found to operate satisfactorily at an input pulsing rate of 50 pulses per second. It was found that the circuit would operate at this pulsing rate for a period of at least four hours without missing a count. A tank circuit frequency of 45 kilocycles per second and a synchronizing frequency of 450 kilocycles per second were used in this circuit.

The rate at which the pulses may be supplied is determined mainly by the constants of the pulsing circuit. The maximum permissible pulsing frequency may be increased by suitably shortening the time constants of the circuits for generating the pulses.

A particular circuit has been described for generating the pulses supplied to the tank circuit 104. However, it should be obvious to those skilled in the art that other forms of circuits for generating a pulse of precise amplitude duration and timing from input pulses of random amplitude and timing may be substituted therefor. Systems employing both negative and positive pulses may be employed for selectively advancing or retarding the phase of the oscillation in the tank circuit. A circuit of this type may be employed to subtract the number of pulses of one polarity from the number of pulses of the opposite polarity and then store the result as a particular phase of the oscillatory signal. The positive and negative pulses may be interspersed if desired.

Figure 6:
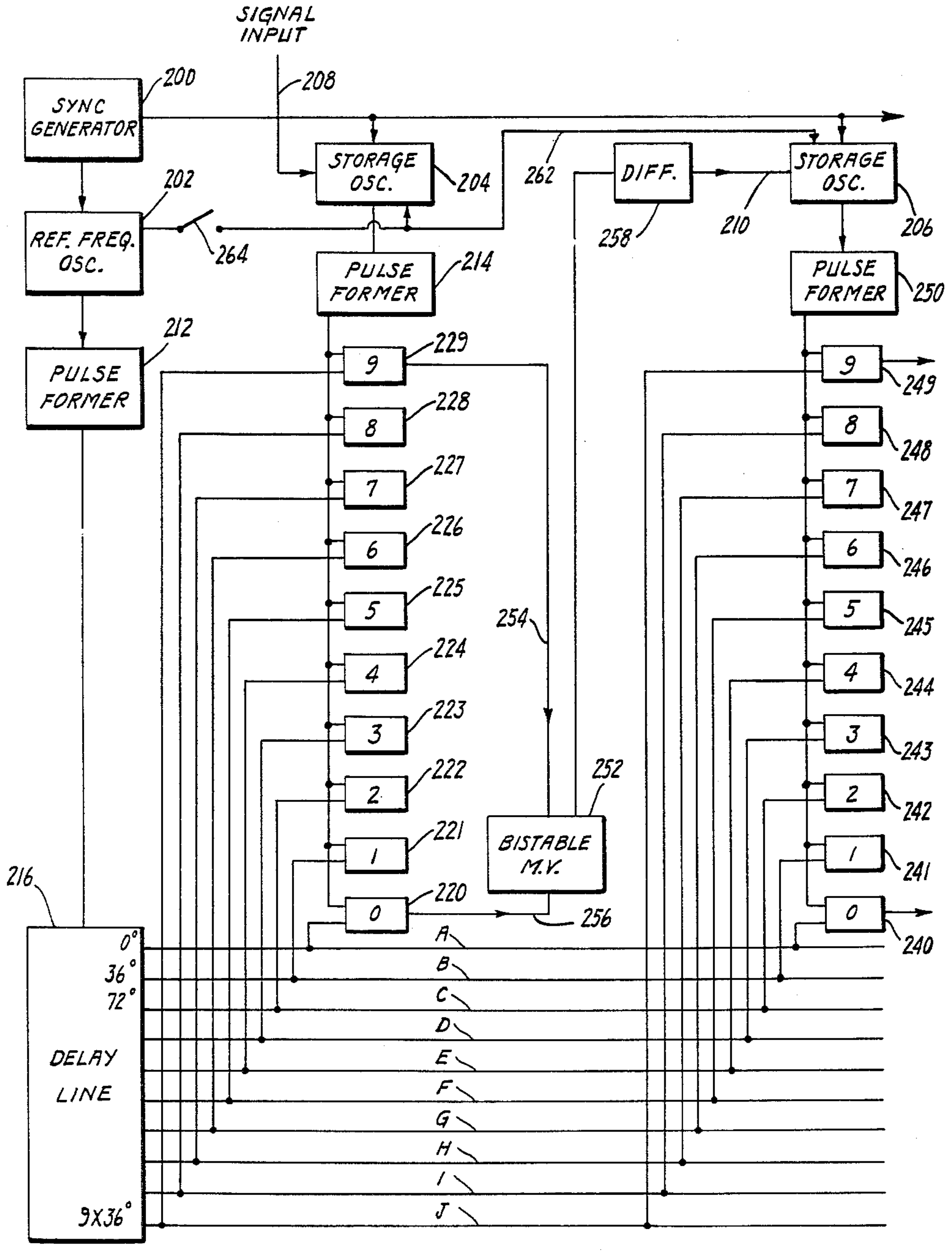
Fig. 6 is a block diagram of a decimal counter system employing the storage oscillator circuits of Figs. 2 and 3.

Fig. 6 is a decimal counter circuit which includes two of the circuits of Fig. 2 or Fig. 3. In Fig. 6 the synchronizing source is represented by block 200. The reference frequency oscillator is represented by block 202. Blocks 204 and 206 represent storage oscillators which may be stepped in phase by signals supplied to inputs 208 and 210 respectively. A pulse former 212 is connected to the output of oscillator 202. Pulse former 212 may be an amplifier stage biased for class C operation. Preferably the bias is such that an output signal is generated only in response to the positive peak of the signal from reference oscillator 202 and so that the time width of this output signal is substantially less than $\frac{1}{10}$ of a cycle of the signal from reference frequency oscillator 202. A tapped delay line 216 is connected to the output of pulse former 212. The number of taps on delay line 216 corresponds to the radix of the number system used in the counter. In the example shown in Fig. 6 delay line 216 has ten taps spaced 36° apart in phase. This spacing is measured at the frequency of the reference oscillator 212. Tap A is at zero phase, that is the signal appearing at tap A occurs in time coincidence with the signal from pulse former 212. The signal at tap B occurs 36° or $\frac{1}{10}$ of a cycle later in time than the signal on tap A. The taps A through J are connected to coincidence indicator circuits 220 to 229 respectively.

A second pulse former 214 is connected to the output of storage oscillator 204. Again pulse former 214 may be any suitable circuit for generating a narrow pulse at a selected point in the cycle of a sinusoidal wave. For example, it may be a second amplifier stage biased for class C operation.

A second input of each of coincidence indicator circuits 220 to 229 is connected to the output of pulse former 214. Each of the coincidence indicator circuits 220 to 229 inclusive may comprise a vacuum tube amplifier stage having two control grids both of which must be energized before an output signal is generated. Therefore coincidence indicator circuit 220 will provide an output signal only if storage oscillator 204 is in a zero or reference phase. Coincidence indicator circuit 221 will provide an output signal only if the phase of storage oscillator 202 has been changed by one step of 36°. Coincidence indicator circuits 220 to 229 may incorporate some form of visual indicator such as a neon tube or meter movement in the anode circuit of the amplifier stage. This visual indicator will be actuated only if the coincidence indicator circuit is providing an output signal. The circuit of Fig. 6 thus far described will permit counting from zero to nine. The addition of a second storage oscillator and a second set of coincidence indicator circuits will extend the counting range to 99. The second group of coincidence indicator circuits 240 to 249 inclusive are connected to taps A through J, respectively of delay line 216. The output of coincidence indicator circuit 229 is connected to one input 254 of a bi-stable multivibrator 252. Multivibrator 252 may be any circuit which is triggered from one stable state to the other in response to a signal from coincidence indicator circuit 229 and will remain in this stable state even though additional signals are supplied thereto from coincidence indicator circuit 229. The output circuit of coincidence indicator circuit 220 is connected to a second signal input 256 of bi-stable multivibrator 252 is so arranged that it is returned to its first stable state by a signal from coincidence indicator circuit 220. It will remain in this first stable state even though additional signals are supplied by coincidence circuit 220.

The output of bi-stable multivibrator 252 is connected to the signal input 210 of storage oscillator 206 through a differentiating circuit 258. Differentiating circuit 258 produces pulses at the transition portions of the rectangular wave from multivibrator 252. The stable states of multivibrator 252 are so selected that only the pulse generated in response to the signal supplied to input 256 will step storage oscillator 206. Multivibrator 252 and differentiating circuit 258 form a circuit for generating a single pulse in time coincidence with the first of a series of pulses of one polarity. Any other circuit for accomplishing this result may be substituted for multivibrator 252 and differentiating circuit 258 without changing the mode of operation of the circuit of Fig. 6.

A pulse former 250 is connected to the output of storage oscillator 206. This pulse former may be similar to pulse formers 212 and 214. The output of pulse former 250 is connected to one input of each of coincidence indicator circuits 250 to 249 inclusive. The means for initially establishing a preselected phase relationship between the signals generated by oscillators 202, 204 and 206 is represented schematically by the connection 262 and switch 264.

The circuit of Fig. 6 operates in the following manner. The signal from synchronizing source 200 maintains reference frequency oscillator 202 at a fixed phase. Pulse former 212 generates a series of equally-spaced pulses. Each pulse occurs in time coincidence with a selected portion of the cycle of reference oscillator 202. As mentioned above, this pulse may occur in time coincidence with the positive peak of the signal from reference oscillator 202. Delay line 216 produces ten series of pulses, each series having the same repetition rate as the signal from reference oscillator 202. The pulses in any series are spaced from the corresponding pulses of the adjoining series by 1/10 of a cycle of the signal from reference oscillator 202. These pulse series from delay line 216 are supplied to the inputs of coincidence indicator circuits 220 to 229. The frequency of oscillator 204 is maintained at the frequency of reference oscillator 202 by the signal from synchronizing source 200. Pulses to be counted are supplied to signal input 208 and cause the phase of the storage oscillator 204 to be shifted in the manner previously described. The phases that the signal of oscillator 204 may assume are limited to any one of ten possible values by the signal from synchronizing source 200. Pulse former 214 provides a series of pulses having a repetition rate equal to the frequency of the signals generated by oscillators 202 and 204. This series of pulses will occur in time coincidence with one and only one of the series of pulses provided by delay line 216. One of the coincidence indicator circuits 220 to 229 will have an output signal because of this time coincidence. If oscillator 204 is in its reference or zero phase, coincidence circuit 220 will have an output signal. This output signal will again be a series of pulses at the frequency of oscillator 204. If the frequency of operation of oscillator 204 is sufficiently high, a neon tube in the anode circuit of the coincidence indicator circuit 220 will appear to have a steady glow due to the visual retention of the eye of the viewer. If the phase of oscillator 204 is advanced one step by a single signal supplied to input 208, coincidence indicator circuit 220 will cease to have an output signal and coincidence indicator circuit 221 will have an output signal. A signal from coincidence indicator circuit 221 will again be a series of pulses having a frequency equal to that of the frequency of oscillator 204. Suppose now that oscillator 204 starts out in its reference phase, the signals from coincidence indicator circuit 220 will set bi-stable multivibrator 252 in its reference position. Multivibrator 252 will be insensitive to all pulse signals except the first from coincidence indicator circuit 220. Suppose now that nine impulses are supplied to input 208. Coincidence circuits 220 to 229 will each provide an output signal in turn. The first pulse signal from coincidence circuit 229 will set bi-stable multivibrator 252 to its second stable state. Differentiating circuit 258 will provide a pulse as multivibrator 252 changes from one stable state to the other. However, the polarity of this pulse will be such that the phase of oscillator 206 is not affected. Multivibrator 252 will remain in this second stable state and will be insensitive to additional pulses supplied by coincidence circuit 229. Suppose now that one more pulse is supplied to input 208. In this case, storage oscillator 204 will have been stepped by one complete cycle so that coincidence circuit 220 will again have an output signal. The output signal of coincidence circuit 220 will return bi-stable multivibrator 252 to its first or reference stable state. Differentiating circuit 258 will provide a second output signal in response to the transition of the multivibrator 252 from its second stable state to its first stable state. This pulse will be of proper polarity to step storage oscillator 206 by 1/10 of a cycle. If oscillator 206 was originally in its reference phase, coincidence indicator circuit 240 will cease to provide an output signal and coincidence indicator circuit 241 will provide an output signal. Therefore coincidence circuit 220 will be registering zero or reference phase and coincidence circuit 241 will be representing a step of one from zero. This may be interpreted as one, zero or ten, indicating that ten pulses have been supplied to input 208. Therefore the circuit shown in Fig. 6 will count to 99. If the multivibrator circuit 252, differentiating circuit 258 and the circuits associated with oscillator 206 are repeated, a circuit may be formed which will count to 999. Additional means may also be provided for supplying signals directly to input 210 of oscillator 206 from some outside source. Signals introduced at this point will step the counter by intervals of ten. Care should be taken that the signals are not supplied to input 210 from this outside source and from bi-stable multivibrator 252 simultaneously. However, this can be taken care of in a desk type calculator, for example, by providing separate keys which must be depressed in sequence to register tens and units.

While the invention has been described with reference to the preferred embodiments thereof, it will be apparent that various modifications and other embodiments thereof will occur to those skilled in the art within the scope of the invention. Accordingly I desire the scope of my invention to be limited only by the appended claims.

What is claimed is:

1. An information storage system comprising a source of a periodic synchronizing signal, first and second oscillator circuits coupled to said source of synchronizing signal, said oscillator circuits each being constructed and arranged to operate at a frequency which is equal to $1/n$ times the repetition rate of said synchronizing signal, where $n$ is an integer greater than one and is the same for each oscillator circuit, each of said oscillator circuits being further constructed and arranged to maintain a preselected phase relationship between the oscillations generated thereby and said periodic synchronizing signal, means associated with said first and second oscillator circuits for initially establishing a preselected phase relationship between the signals generated by said first and second oscillator circuits, at least one of said oscillator circuits being a tuned oscillator circuit including an L–C tank circuit, and a source of pulse signals coupled to said tank circuit of said tuned oscillator circuit for shifting the phase of oscillation of said tuned oscillator circuit by $a/n$ cycles of said oscillation for each selected pulse supplied by said pulse source, where $a$ is an integer less than $n$, said selected pulses being representative of the information to be stored.

2. An impulse counter circuit in accordance with claim 1, said counter circuit further comprising means associated with said first and second oscillator circuits for indicating the relative phases of the signals generated thereby.

3. A circuit for shifting the phase of a signal in preselected steps, said circuit comprising a source of a periodic synchronizing signal, an oscillator circuit including a tank circuit tuned to a frequency which is equal to $1/n$ times the repetition rate of said synchronizing signal, where $n$ is an integer greater than one, means connecting said source to said oscillator circuit, said connection being such that said oscillator is caused to maintain a fixed phase of oscillation with respect to said synchronizing signal supplied by said source, and means for supplying a unipolar pulse of energy to said tank circuit, said pulse having a duration less than the duration of one half cycle of the signal to be shifted in phase, said pulse having an amplitude, duration and time of occurrence such that the phase of the oscillations in said tank circuit is shifted by $a/n$ cycles, where $a$ is an integer other than $n$.

4. An impulse counter comprising a tuned oscillator circuit including a parallel connected L–C tank circuit, a source of periodic synchronizing signals coupled to said oscillator circuit, said oscillator circuit being arranged to operate at a frequency equal to $1/n$ times the repetition rate of said synchronizing signal and in selected ones of $n$ stable phases with respect to said synchronizing signal, where $n$ is an integer greater than one, a source of unipolar pulse signals connected in shunt with said tank circuit, said pulse source being constructed and arranged to provide in response to an impulse supplied thereto a unipolar pulse of selected amplitude and time duration at a selected time in the cycle of the signal generated by said oscillator, said unipolar pulse having a duration less than the duration of one half cycle of the signal generated by said oscillator, and means for supplying said impulses to be counted to said pulse source to control the operation thereof.

5. An impulse counter comprising a Hartley oscillator circuit including an L–C tank circuit and an amplifier stage coupled thereto, a source of periodic synchronizing signals coupled to the anode circuit of said amplifier stage, said oscillator circuit being arranged to operate at a frequency equal to $1/n$ times the repetition rate of said synchronizing signal, where $n$ is an integer greater than one, a source of unipolar pulse signals connected in shunt with said tank circuit, said pulse source being constructed and arranged to provide in response to an impulse supplied thereto a unipolar pulse of selected amplitude and time duration at a selected time in the cycle of the signal generated by said oscillator, said unipolar pulse having a duration equal to a small fraction of one half cycle of the signal generated by said oscillator, and means for supplying said impulses to be counted to said pulse source to control the operation thereof.

6. An impulse counter comprising a tuned oscillator circuit including a parallel connected L–C tank circuit, a source of periodic synchronizing signals coupled to said oscillator circuit, said oscillator circuit being arranged to operate at a frequency equal to $1/n$ times the repetition rate of said synchronizing signal, where $n$ is an integer greater than one, and means for impressing a pulse of selected amplitude and time duration across said tank circuit at a selected time in the cycle of the signal generated by said oscillator, said last-mentioned means comprising a unistable multivibrator circuit, means for supplying said impulses to be counted to said multivibrator circuit to control the operation thereof, a coincidence circuit having first and second inputs, said coincidence circuit having one input thereof connected to the output of said multivibrator circuit, means connecting said second input to said tank circuit, said coincidence circuit providing, for each cycle of said multivibrator, at least one timing signal occurring at a selected point in the cycle of the signal generated by said oscillator circuit, pulse generating means connected to the output of said coincidence circuit for generating in response to said one timing signal a single pulse of preselected amplitude and time duration at a selected point in the cycle of the signal generated by said oscillator circuit, means connecting the output of said pulse generating means in shunt with said tank circuit, whereby said oscillator circuit is caused to shift in phase by a fraction of a cycle equal to $a/n$ for each impulse supplied to said multivibrator, where $a$ is an integer less than $n$.

7. An information storage system comprising a tuned oscillator circuit provided with a frequency-determining inductance-capacitance tank circuit, a source of periodic signals having a repetition frequency $nf_0$, where $n$ is an integer greater than 1 and $f_0$ is the operating frequency of said oscillator, means connecting said source to said oscillator to control the frequency and phase of the oscillatory signal generated thereby, means responsive to the information to be stored to produce unipolar energy pulses representative of said information, said pulses having a duration less than a half cycle of the oscillatory signal generated by said oscillator circuit, and means connected between the output of said pulse producing means and said tank circuit to supply said energy pulses to said tank circuit thereby to shift the phase of the oscillatory signal present therein.

8. The system of claim 7 wherein the time duration, amplitude and time of occurrence of said produced pulses are selected to cause the phase shift produced by each pulse to be an integral number of periods of said synchronizing signal.

9. An information storage system comprising a tuned oscillator circuit provided with a frequency-determining inductance-capacitance tank circuit, an amplifier element having an input connection and an output connection, and means connecting said output connection, said tank circuit and said input connection in a regenerative oscillatory loop, a source of periodic signals having a repetition frequency $nf_0$, where $n$ is an integer greater than 1 and $f_0$ is the operating frequency of said oscillator, means connecting said source to said oscillator to control the frequency and phase of the oscillatory signal generated thereby, means responsive to the information to be stored to produce unipolar energy pulses representative of said information, said unipolar pulses having a duration equal to a small fraction of a cycle of the oscillatory signal generated by said oscillator circuit, and means connected between the output of said pulse producing means and a selected point in said regenerative oscillatory loop to supply said energy pulses to said tuned oscillator circuit thereby to shift the phase of the oscillatory signal generated in said regenerative oscillatory loop.

10. The system of claim 9 wherein the time duration, amplitude and time of occurrence of said produced pulses are selected to cause the phase shift produced by each pulse to be an integral number of periods of said synchronizing signal.

11. An information storage system comprising a tuned oscillator circuit provided with a frequency-determining inductance-capacitance tank circuit, a source of periodic signals having repetition frequency $nf_0$, where $n$ is an integer greater than 1 and $f_0$ is the operating frequency of said oscillator, means connecting said source to said oscillator to control the frequency and phase of the oscillatory signal generated thereby, means responsive to the information to be stored to produce unipolar energy pulses, said unipolar pulses having a duration equal to a small fraction of a cycle of the oscillatory signal generated by said oscillator circuit, the number of pulses produced being representative of said information to be stored, and means connected between the output of said pulse producing means and said tank circuit to supply said energy pulses to said tank circuit, the amplitude, time duration and time of occurrence of said produced pulses being selected to cause the shift in phase produced by each pulse to be equal to $a/n$ cycles of said oscillatory signal, where $a$ is an integer less than $n$.

12. An information storage system comprising a tuned oscillator circuit provided with inductor means and capacitor means connected in shunt to form a frequency determining inductance-capacitance tank circuit, an amplifier element having an input connection and an output connection, and means connecting said output connection, said tank circuit and said input connection in a regenerative oscillatory loop, a source of periodic signals having a repetition frequency $nf_0$, where $n$ is an integer greater than one and $f_0$ is the operating frequency of said oscillator, means connecting said source to said oscillator to control the frequency and phase of the oscillatory signal generated thereby, means responsive to the information to be stored to produce unipolar energy pulses representative of said information, said unipolar pulses having a duration equal to a small fraction of the cycle of the oscillatory signal generated by said oscillator circuit, and resistor means and second capacitor means connected in series circuit, said series circuit being connected in shunt with said first capacitor means in said tank circuit, the output of said pulse producing means being connected across said resistor means.

References Cited in the file of this patent

UNITED STATES PATENTS

| | | |
|---|---|---|
| 2,445,161 | Vogel | July 13, 1948 |
| 2,580,740 | Dickinson | Jan. 1, 1952 |
| 2,659,009 | Emslie | Nov. 10, 1953 |
| 2,738,423 | Sziklai | Mar. 13, 1956 |